Jan. 1, 1952 E. J. ROSSMAN ET AL 2,581,300
FOCUSING AND ILLUMINATING DEVICE FOR CAMERAS
Filed May 23, 1949 2 SHEETS—SHEET 1

INVENTORS
EDWARD J. ROSSMAN
BY Byron F. Bower
Wilfred E. Lawson
ATTORNEY

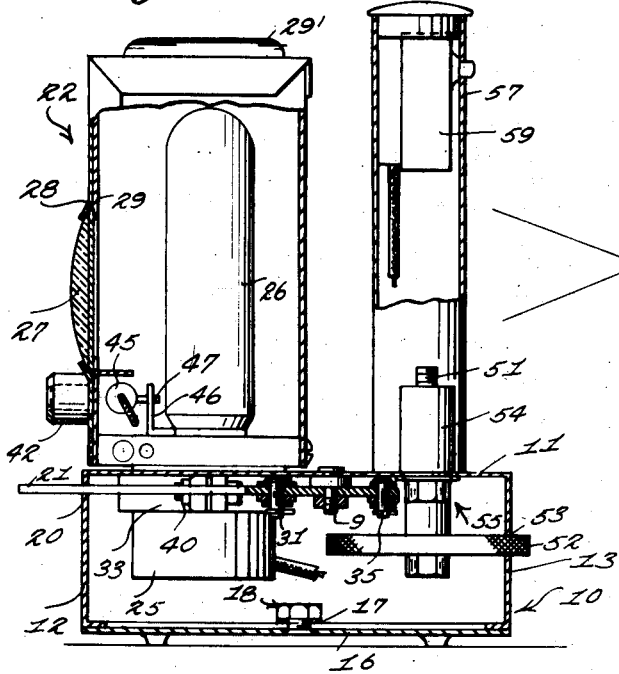
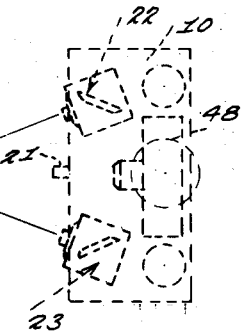
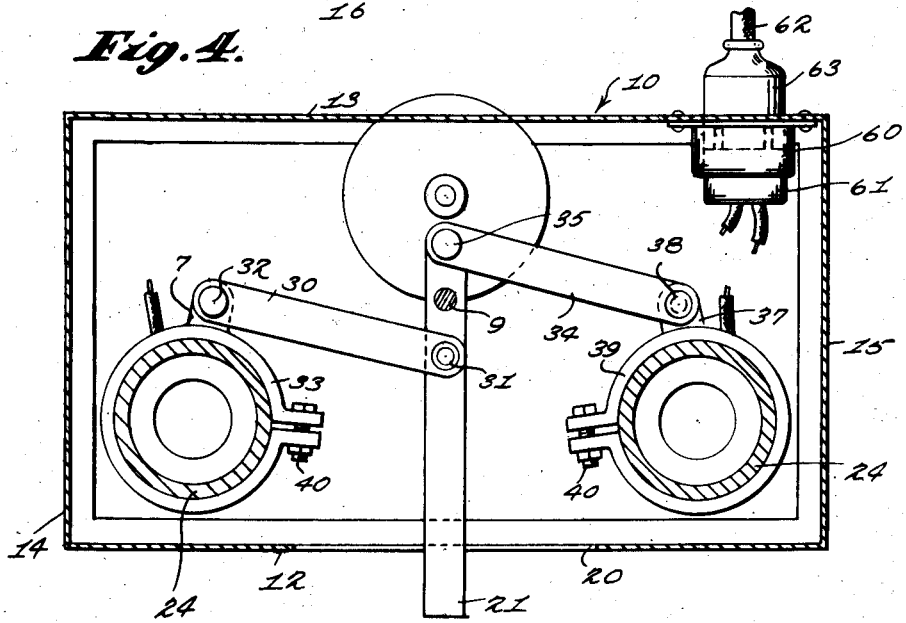

Patented Jan. 1, 1952

2,581,300

UNITED STATES PATENT OFFICE 2,581,300

FOCUSING AND ILLUMINATING DEVICE FOR CAMERAS

Edward J. Rossman and Byron F. Bower, Aurora, Ill.

Application May 23, 1949, Serial No. 94,876

4 Claims. (Cl. 95—44)

This invention relates to photographic equipment, and more particularly to a focusing and illuminating device, hereinafter termed an adaptor for facilitating the focusing of a camera.

The object of the invention is to provide an adaptor which will enable the user to quickly and accurately focus a camera without the use of tapes, measuring rods and the like.

Another object of the invention is to provide an adaptor which can be used to focus various types of cameras, the adaptor permitting accurate focusing in ordinarily inaccessible places such as the mucous membranes of the posterior pharynx, body cavities and the like.

Still another object of the invention is to provide an adaptor which includes floodlights and focusing lights which are manually moved in order to focus the camera and properly light up the object being photographed.

A further object of the invention is to provide a camera adaptor which is extremely simple and inexpensive to manufacture.

Other objects and advantages will be apparent during the course of the following description.

In the accompanying drawings, forming a part of this application, and in which like numerals are used to designate like parts throughout the same:

Figure 3 is a sectional view taken on the line 3—3 of Figure 1;

Figure 4 is a sectional view taken on the line 4—4 of Figure 1; and

Figure 5 is a diagrammatic view illustrating the use of the adaptor when focusing a camera.

Figure 1:
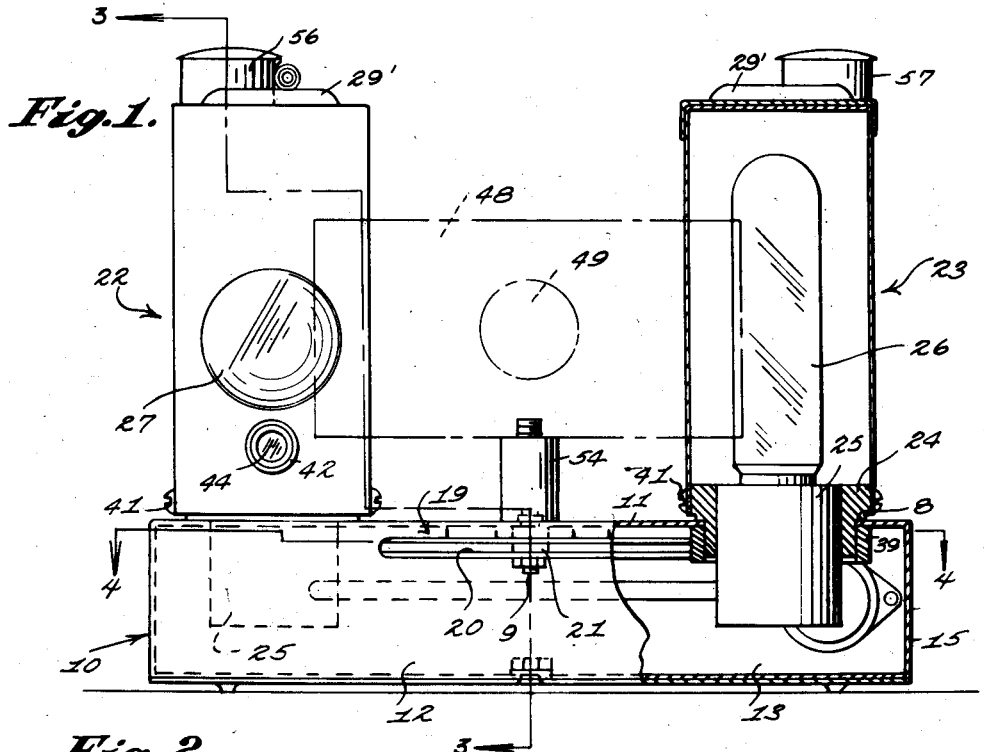
Figure 1 is a front elevational view of the camera adaptor, with parts broken away and in section, according to the present invention.
Figure 2:
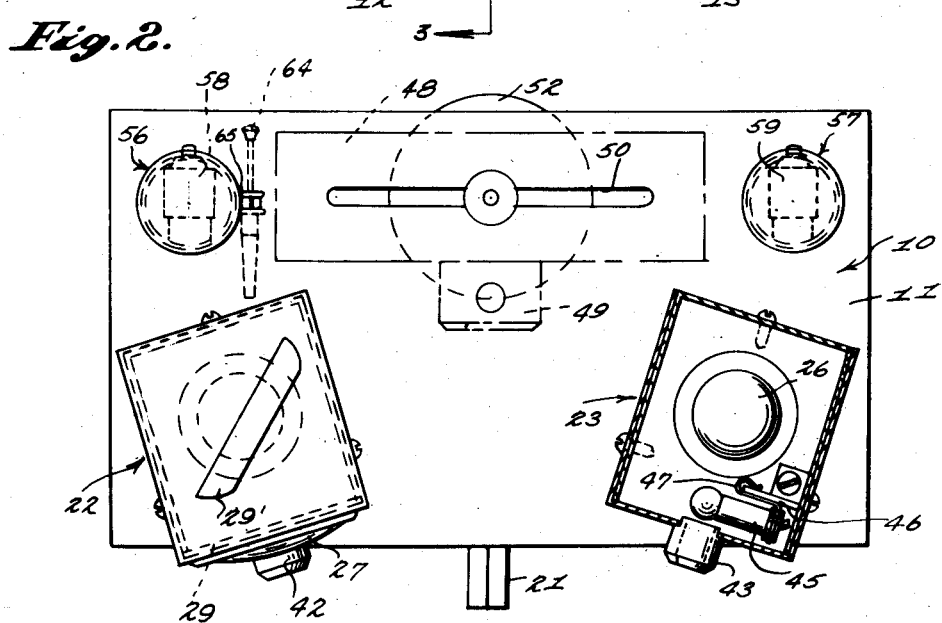
Figure 2 is a top plan view of the camera adaptor, with parts broken away and in section.

Referring in detail to the drawings, the adaptor for the camera comprises a base 10 which includes a top wall 11, and secured to the top wall 11 or formed integral therewith is a front wall 12. A rear wall 13 is arranged in spaced parallel relation with respect to the front wall 12 and is secured to the top wall 11 or formed integral with the latter. The base 10 further includes end walls 14 and 15 which extend between the front and rear walls, and the end walls 14 and 15 are arranged in spaced parallel relation with respect to each other. A bottom wall 16 is releasably secured to a strip 17 by a suitable bolt and nut assembly 18, the strip 17 being secured to the base 10.

The front wall 12 is provided with a calibrated scale 19, Figure 1, which is arranged adjacent the top thereof and arranged just below the scale 19 is an elongated slot 20. A lever 21 projects through the slot 20 and a suitable bolt and nut assembly 9 pivotally connects the lever 21 to the top wall 11 of the base 10 for a purpose to be later described.

The top wall 11 is provided with a pair of spaced circular cutouts 8 adjacent the front thereof. A first lamp housing 22 is rotatably supported in one of the cutouts 8 and a second lamp housing 23 is rotatably supported in the other cutout 21. Since each of the lamp housings 22 and 23 have the same construction, it will suffice to describe only one in detail. Thus, each of the housings comprises a support member 24 which is rotatably seated in the cutout 21 and the support member 24 carries a socket 25 which supports therein a floodlight bulb 26 which may be a 500 watt bulb. Each of the housings 22 and 23 carries a large lens 27 which is maintained in an embossed hole 28 by a slidable gate 29, the gate serving to prevent accidental movement of the large lens 27 out of the hole 28. The lens 27 serves to focus the beam of light emitted by the floodlight bulb 26. Further, each of the housings 22 and 23 are provided with a vent 29' in its top, to insure adequate ventilation for the interior of the housings.

For rotating the housings 22 and 23 simultaneously in opposite directions, a linkage arrangement is provided. Thus, a first link 30 has one of its ends pivotally connected to the lever 21 by a pin 31, while the other end of the link 30 is pivotally connected to an ear 7 of a clamp 33 by a pin 32. The clamp 33 is arranged in embracing relation with respect to the support member on the lower end of the housing 22. A second link 34 has one of its ends pivotally connected to the rear end of the lever 21 by means of a pin 35, while the other end of the lever 34 is pivotally connected to an ear 37 by a pin 38, the ear 37 being formed integral with or secured to a clamp 39. The clamp 39 is arranged in embracing relation with respect to the support member 24 on the lower end of the housing 23. A suitable bolt and nut assembly 40 maintains each of the clamps 33 and 39 on its respective support member. The housings 22 and 23 are secured to the support members 24 by suitable securing elements, such as screws 41 so that manual movement of the lever 21 causes simultaneous rotation of the housings 22 and 23 in opposite directions.

Arranged below the large lens 27 in the housing 22 is an extension mounting 42 which has a plano-convex lens 44 mounted therein. A similar extension mounting 43 is arranged below the large lens 27 in the housing 23 and the extension mounting 43 also carries a plano-convex lens 44. Arranged rearwardly of each of the extension mountings 42 and 43 and positioned in each of the lamp housings 22 and 23 is a focusing light 45 which is releasably supported on a plate 46 by means of a clip 47. The beams of light from the focusing lights 45 are adapted to converge at a point in order to aid the user in focusing the camera.

The camera which is to be used for taking the photographs is shown in broken lines and is indicated generally by the numeral 48, the camera including the usual adaptor lens 49. The base 10 has a slot 50 whereby any 35 mm. camera or reflex camera can be accommodated thereon and the camera 48 is adjustably supported on the top wall 11 of the base 10, so that the camera can be moved to any desired position. Thus, the top wall 11 is provided with the slot 50 and projecting through the slot 50 is a threaded shank or bolt 51, the upper end of the bolt 51 being arranged in threaded engagement with a socket in the bottom of the camera 48. A knurled disc 52 is connected to the lower end of the bolt 51 for rotating the latter, and the knurled disc 52 conveniently projects through an elongated slot 53 in the rear wall 13 in order to permit rotation of the disc by the user's hand. The disc 52 is arranged within the base 10, and arranged above the top wall 11 is an exteriorly knurled bushing 54 which is arranged in threaded engagement with the bolt 51. Thus, the bushing 54 can be tightened or loosened on the bolt 51 in order to permit shifting movement of the camera 48. The bushing 54 is knurled exteriorly to facilitate manual rotation thereof, and upon proper rotation of the bushing 54 and disc 52, the bushing 54 can be loosened on the bolt 51 to permit the camera 48 to be shifted to the desired location. After the camera has been located properly, the bushing 54 is again tightened on the bolt 51 to maintain the camera 48 immobile in its adjusted position. Suitable nuts 55 are circumposed on the bolt 51 and serve to properly space the disc 52 from the top wall 11.

Arranged rearwardly of the lamp housing 22 and secured to the base 10 is a tubular member 56, and a similar tubular member 57 is arranged rearwardly of the lamp housing 23 and is also secured to the base 10. The tubular members 56 and 57 serve as hand grips when the adaptor is being used. Carried by the tubular member 56 is a momentary contact switch 58 for actuating the focusing lights 45, and carried by the other tubular member 57 is a momentary contact switch 59 for actuating the 500 watt floodlights 26. A bracket 60 is secured to the inner surface of the rear wall 13, and the bracket 60 carries a male plug 61 which is electrically connected by suitable cables to the floodlights and focusing lights and the member 61 is also electrically connected to the switches 58 and 59. The adaptor is connected to a suitable source of electrical energy by means of a cable 62 which has a female plug 63 arranged in engagement with the male plug 61.

In use, the lever 21 is positioned in accordance with a calibration on the scale 19 as described below. Then, the beams from the focusing lights 45 will pass through the extension mountings 42 and 43 and will superimpose or cross at a point equivalent to the focal length of the lens 49 of the camera 48. This arrangement permits quick focusing without the use of tapes, measuring rods, and the like, and permits accurate focusing in ordinarily inaccessible places, such as the mucous membranes of the posterior pharynx, body cavities and the like.

The camera can be set or focused without requiring a high degree of skill. The tubular member 57 contains the momentary contact switch 58 which serves to actuate the focusing lights 45, while the other tubular member 57 carries the momentary contact switch 59 for actuating the 500 watt floodlights 26. Thus, in using the camera, the lever 21 is positioned at the selected calibrated distance for focusing, and then the switch 58 is depressed to thereby actuate the focusing lights 45. Then, the adaptor and camera are moved forward toward the object being photographed until the two focusing spots from the lights 45 are superimposed. The pressure on the switch 58 is then released, and then the momentary contact switch 59 is depressed to actuate the floodlights 26. Immediately thereafter, the camera shutter is tripped by means of a cable release 64, the cable release 64 being supported on the tubular member 56 by a bracket or clip 65.

Thus, it will be seen that by moving the lever 21, both of the lamp housings 22 and 23 will be moved simultaneously and in opposite directions in order to cause the light beams to converge at required distances from the camera lens. The linkage 30 and 34 and the lever 21 causes both lamp houses to rotate by a single movement of the lever 21. Further, as best seen in Figure 5, the focal lengths of the camera lens 49 is readily ascertained by having the beams from the focusing lights 45 converge at a single point. The adaptor is so constructed that the floodlights 26 and the focusing lights 45 move in unison when the actuating lever 21 is adjusted. Further, the clip 47 enables the pin point focusing lights 45 to be adjusted in order to insure that the lights 45 are in the same plane so that the position of the lights 45 will correspond with the calibrations of the adaptor.

What we claim:

1. In a focusing and illuminating device, a flat rectangular base, a pair of housings pivotally mounted on said base spaced along the front side of the top surface of said base, a lens mounted in the front side of each of said housings, an electric lamp mounted within each of said housings in rear of said lenses, tubular elements projecting from the front sides of said housings below said lenses, other lenses mounted within said tubular elements, an electric lamp mounted within each of said housings in line with said tubular elements, means on said base to support a camera rearwardly of said housings in centered relation with respect thereto and with the camera lens axis extending between said housings, means mounted on the lower side of said base and operatively connected with said housings for simultaneously adjusting the same equally and in opposite directions about their respective pivots to direct light beams projected by said lenses to establish a focal point at a given focal distance from the lens of the camera, and switch means mounted on said base at opposite sides of the camera for controlling said lamps, the first lamps independently of the second lamps.

2. The invention as defined in claim 1, with the said supporting means for the camera comprised in a laterally adjustable base plate for accurately centering the camera relatively to said housings.

3. The invention as defined in claim 1, with the said adjusting means for said housings comprised in a lever pivotally mounted below said base and having an end thereof projecting forwardly beyond the front side of the base, and laterally disposed links pivoted at one of their ends centrally with respect to the rear sides of said housings and at their other ends to said lever to either side of the pivot mounting thereof.

4. The invention as defined in claim 1 with circular members rotatably mounted in said base and supporting said housings and said adjusting means for the housings comprised in a lever pivotally mounted below said base and having an end thereof projecting forwardly beyond the front side of the base, a disc rotatably mounted on the lower side of said base and having a portion of its periphery projecting beyond the rear side of the base and carrying the pivot mounting of the lever, and laterally disposed links pivoted at one of their ends to said circular members and at their other ends to said levers to either side of the pivot mounting thereof.

EDWARD J. ROSSMAN.
BYRON F. BOWER.

REFERENCES CITED

The following references are of record in the file of this patent:

UNITED STATES PATENTS

| Number | Name | Date |
| --- | --- | --- |
| 2,200,458 | Steiner | May 14, 1940 |
| 2,239,379 | Bucky | Apr. 22, 1941 |
| 2,279,443 | Chanosky | Apr. 14, 1942 |
| 2,305,437 | Meyers et al. | Dec. 15, 1942 |
| 2,312,261 | Mills | Feb. 23, 1943 |
| 2,314,829 | Hunter | Mar. 23, 1943 |
| 2,337,463 | Hall | Dec. 21, 1943 |
| 2,371,593 | Gorey et al. | Mar. 13, 1945 |
| 2,403,308 | Schwartz et al. | July 2, 1946 |